United States Patent [19]
Bennett

[11] 3,774,149
[45] Nov. 20, 1973

[54] ELECTRICAL GUIDE FOR VEHICLE TRAILER HITCH

[76] Inventor: Doyne R. Bennett, 5114 Kickapoo Dr., Kokomo, Ind. 46901

[22] Filed: Sept. 7, 1972

[21] Appl. No.: 287,090

[52] U.S. Cl............... 340/52 R, 307/10 R, 340/282
[51] Int. Cl................................................ B60q 1/00
[58] Field of Search.................... 340/52 R, 282, 51, 340/61; 307/10 R

[56] References Cited
UNITED STATES PATENTS

| | | | |
|---|---|---|---|
| 3,418,628 | 12/1968 | Fenner............................ | 340/52 R |
| 2,797,406 | 6/1957 | Tanis et al. ...................... | 340/52 R |
| 2,879,350 | 3/1959 | Howell.............................. | 340/51 |

Primary Examiner—John W. Caldwell
Assistant Examiner—Glen R. Swann, III
Attorney—John V. Moriarty

[57] ABSTRACT

A guide mountable to a vehicle trailer hitch for indicating via an electrical light the proximity of the trailer with respect to the vehicle. A first rod is mounted to the vehicle second with an electrical light mounted to the top of the rod. The light is connected via an electrical switch mounted to the rod to a source of electrical energy. A wire spring mounted to the rod is engageable with the electrical switch when contacted and moved by a s econd rod mounted to the trailer.

6 Claims, 3 Drawing Figures

PATENTED NOV 20 1973 3,774,149

ELECTRICAL GUIDE FOR VEHICLE TRAILER HITCH

BACKGROUND OF THE INVENTION

1. Field of the Invention

This invention is in the field of trailer hitch guides.

2. Description of the Prior Art

Many types of guides have heretofore been proposed for use particularly in guiding a backing vehicle to an aligned position with a trailer; however, such guides have not been completely satisfactory because they require the vehicle operator to very correctly position the trailer hitch ball on the vehicle with respect to the hitch on the trailer. In many cases, all that is required is to position the trailer hitch ball on the vehicle in the proximity to the hitch on the trailer which can then be manually moved a very short distance by the final connection. Disclosed herein is a device which will guide the vehicle operator to position the vehicle trailer hitch ball in the proximity of the hitch on the trailer. Moreover, in most instances, the prior art guides do not incorporate active elements such as an electrical light to alert the vehicle driver in a quicker manner.

SUMMARY OF THE INVENTION

One embodiment of the present invention is a device for aligning a trailer with a vehicle having a trailer hitch comprising a first vertical rod mounted to the trailer hitch; an electric light mounted to the rod; a pushbutton electrical switch mounted to the rod and connected to the electrical light; a spring mounted to the rod and movable against the switch to activate the light; and, a second vertical rod mounted to the trailer and engageable with the spring to move the spring against the switch.

It is an object of the present invention to provide a new and improved vehicle trailer hitch guide.

It is a further object of the present invention to provide a vehicle trailer hitch guide which will guide the vehicle operator to position the vehicle trailer hitch ball in the proximity of the hitch on the trailer.

Yet another object of the present invention is to provide a vehicle trailer hitch guide which incorporates an electrical light.

Related objects and advantages of the present invention will be apparent from the following description.

DESCRIPTION OF THE PREFERRED EMBODIMENT

Figure 1:
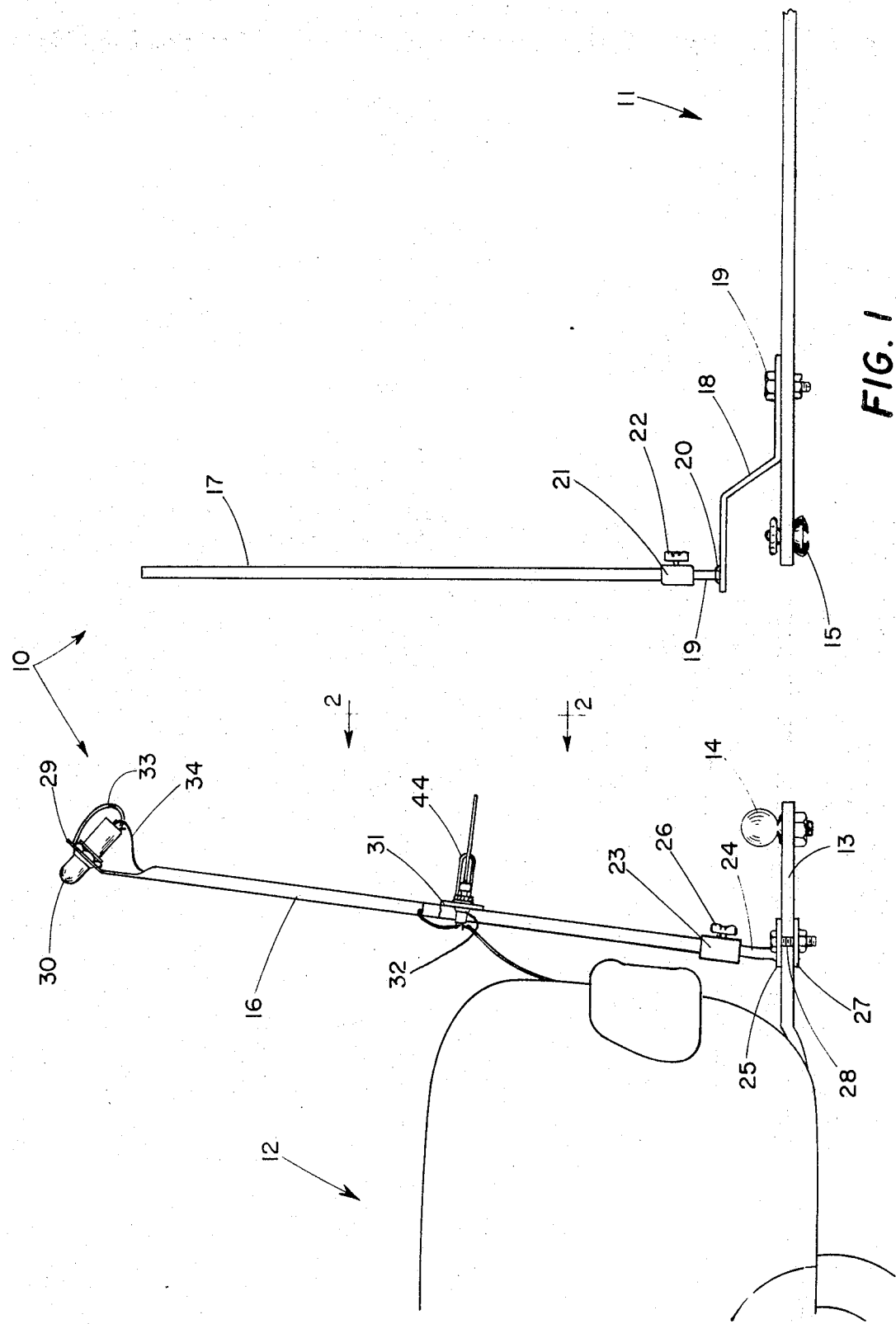
FIG. 1 is a fragmentary side view of a vehicle and trailer having a trailer hitch guide incorporating the present invention mounted thereon.
Figure 2:
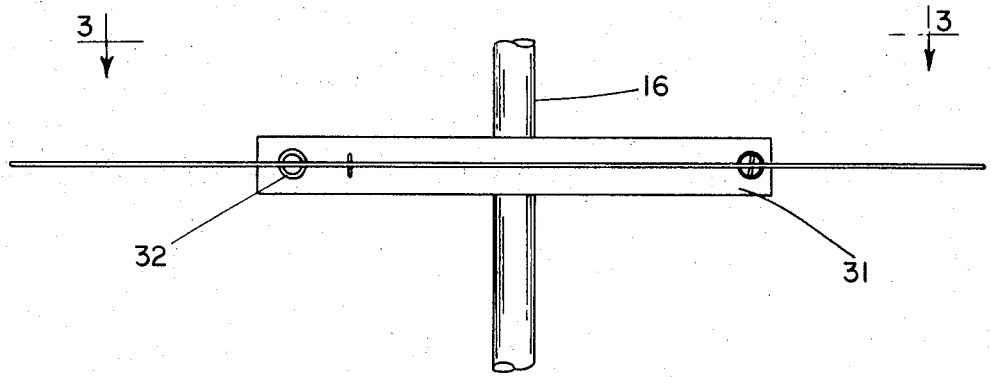
FIG. 2 is an enlarged fragmentary side view looking in the direction of arrows 2—2 of FIG. 1.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to the drawings, there is illustrated a device 10 for aligning a trailer 11 with a vehicle 12. Vehicle 12 has a standard trailer hitch mounted thereon which includes a rearwardly extending bar 13 with a hitch ball 14 mounted atop bar 13. Trailer 11 has a conventional coupler 15 secured thereon which engages ball 14.

A first rod 16 is mounted to bar 13 whereas a second rod 17 is mounted to the trailer and is positioned over coupler 15. A mounting bracket 18 is secured to trailer 11 by a conventional bolt 19 and extends upwardly and over coupler 15. The distal end of bracket 18 has a rod 19 secured thereon by welds 20. Rod 19 has a rectangular cross section and projects up into the hollow interior of collar 21 welded to the bottom end of rod 17. The hollow interior of collar 21 is rectangular in cross section so as to complimentarily receive rod 19. Set screw 22 is threadedly received by collar 21 and projects into the hollow interior against rod 19 thereby securing rod 17 to rod 19. Likewise, a collar 23 is welded to the bottom end of rod 16 and has a hollow interior for receiving rod 24 welded to plate 25. The hollow interior of collar 23 is rectangular in cross section to receive rod 24 which also has a rectangular cross section. Set screw 26 is threadedly received by collar 23 and is abuttable against rod 24 so as to connect rods 16 and 24 together. Plate 25 is spaced apart from plate 27 with bar 13 passing between plates 25 and 27. A pair of bolts 28 connect plates 25 and 27 together on either side of bar 13.

Figure 3:
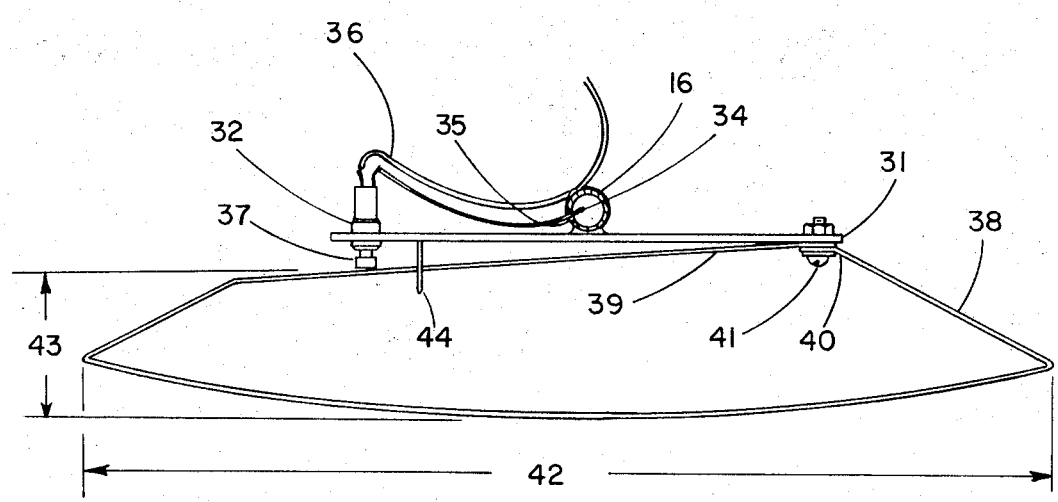
FIG. 3 is a cross sectional view taken along the line 3—3 of FIG. 2 and viewed in the direction of the arrows.

Welded to the top end of rod 16 is a flange 29 which has an electrical light 30 mounted thereto. An elongated plate 31 is welded to rod 16 and has an electrical switch 32 mounted thereon. Light 30 has a pair of electrical wires 33 and 34 with wire 33 contacting flange 29 which is grounded through the vehicle frame. The second wire 34 of light 30 extends downwardly through the hollow interior of rod 16 and exits the rod through aperture 35 (FIG. 3). Wire 34 is then connected to one of the two terminals of electrical switch 32 with the other terminal of switch 32 being connected to wire 36 which is in turn connected to a source of electrical energy. Thus, by depressing button 37 of the switch, the electrical light is connected to a source of electrical energy. With pushbutton 37 in the outwardly extended position, the electrical light is not connected to a source of electrical energy.

Spring 38 is mounted to plate 31 and is movable against button 37 to activate the electrical light. Spring 38 has a generally oblong configuration with a pair of ends 39 and 40 connected to plate 31 by screw fastener 41. Spring 38 has a width 43 which extends rearwardly toward the trailer and a length 42 which extends laterally outward on either side of the rearwardly extending bar 13. The length 42 is a minimum of seven inches. Spring 38 is a wire and extends from end 39 through a closed loop wire 44 mounted to plate 31. Switch 32 is mounted to an end opposite of the end receiving fastener 41. Spring 38 extends from end 39 across plate 31 through loop 44 and then adjacent pushbutton 37. The spring then extends outwardly and back towards end 39 forming a bowed configuration.

As shown in FIG. 1, wire 44 forms an elongated space which extends away from plate 31 allowing spring 38 to move to and from pushbutton 37. When backing the vehicle towards the trailer, the vertical rod 17 will contact spring 38 thereby depressing pushbutton 37 and activating the electrical light. Due to the length 42 of spring 38, all that is required is that the trailer hitch ball be positioned in the proximity of the trailer hitch coupler since spring 38 extends on either side of the rearwardly extending bar 13.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. A device for aligning a trailer with a vehicle having a trailer hitch comprising:
   a first vertical rod mounted to said trailer hitch;
   an electric light mounted to said rod;
   a pushbutton electrical switch mounted to said rod and connected to said electrical light;
   a spring mounted to said rod and movable against said switch to activate said light; and,
   a second vertical rod mounted to said trailer and engageable with said spring to move said spring against said switch.

2. The device of claim 1 wherein:
   said first rod has a plate fixedly mounted thereto, said spring is a wire and has a first end and a second end mounted to an end of said plate with said switch fixedly mounted to an opposite end of said plate, said plate has a closed looped wire mounted thereon and extending outwardly from said plate with said spring extending therethrough, said spring extending from said first end across said plate and through said loop and adjacent a pushbutton of said switch, said spring then extending outwardly and back toward said first end forming a bowed configuration.

3. The device of claim 2 wherein:
   said first rod is hollow and has a flange mounted thereatop with said light mounted on said flange, said light has a first wire in contact with said flange and a second wire extending through said first rod, said first rod including an aperture adjacent said plate with said second wire extending through said aperture and connected to said switch, said switch has a third wire connectable to a source of electrical power.

4. The device of claim 3 wherein:
   said trailer hitch on said vehicle has a rearwardly extending bar with a hitch ball mounted thereatop, said trailer has a trailer ball engaging coupler secured thereon with said second rod positioned over said coupler.

5. The device of claim 4 and further comprising:
   a pair of spaced apart and interconnected plates, said rearwardly extending bar extends through said interconnected plates which have a rectangular cross sectional configured rod connected to said first rod.

6. The device of claim 5 wherein:
   said spring is generally oblong in configuration with a width extending rearwardly towards said trailer and a length extending laterally outward of said rearwardly extending bar with said length at least 7 inches.

* * * * *